United States Patent [19]

Sochor et al.

[11] Patent Number: 4,843,489
[45] Date of Patent: Jun. 27, 1989

[54] DETECTION AND VERIFICATION OF LAPSES OR SHIFTS OF SYNCH WORDS IN PCM DATA

[75] Inventors: Josef Sochor, Dieburg; Werner Staude, Reinheim, both of Fed. Rep. of Germany

[73] Assignee: Robert Bosch GmbH, Stuttgart, Fed. Rep. of Germany

[21] Appl. No.: 125,374

[22] Filed: Nov. 25, 1987

[30] Foreign Application Priority Data

Dec. 13, 1986 [DE] Fed. Rep. of Germany ...... 3642636

[51] Int. Cl.$^4$ .............................................. G11B 5/09
[52] U.S. Cl. ................................................... 360/51
[58] Field of Search .................... 360/51, 39; 375/108, 375/112

[56] References Cited

U.S. PATENT DOCUMENTS 4,037,257 7/1977 Chari ...................................... 360/51
4,040,022 8/1977 Takii ...................................... 360/51

*Primary Examiner*—Vincent P. Canney
*Attorney, Agent, or Firm*—Frishauf, Holtz, Goodman & Woodward

[57] ABSTRACT

A first counter operating at the PCM sampling frequency counts out the normal minimum period between successive synchronization words in the data stream. In a following "window" the detection of another synchronization word produces a check signal and in all other cases a provisional check signal. In such other case the data for the next period are marked as dubious. A second counter counts out twice the minimum normal interval between synchronization words and in a following "window", the appearance of a synchronization word produces a verification signal. The occurrence of a verification signal one normal interval after a provisional check signal removes the marking of intervening data as "dubious". If no verification signal is then produced, the intervening data are marked and treated as erroneous.

4 Claims, 1 Drawing Sheet

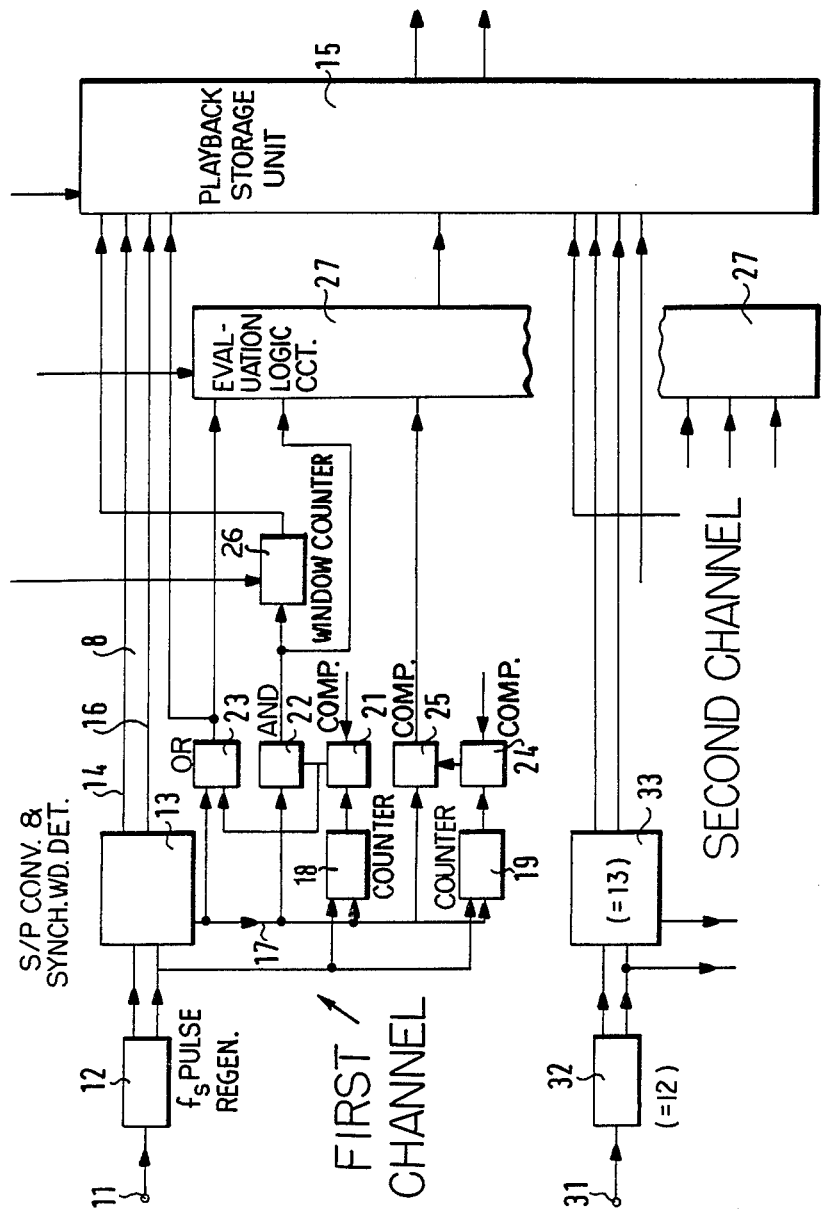

DETECTION AND VERIFICATION OF LAPSES OR SHIFTS OF SYNCH WORDS IN PCM DATA

This invention concerns a method and apparatus for detecting and substituting synchronizing words inserted equidistantly in a pulse code modulated serial data stream when the data stream is reproduced.

A synchronizing signal detection and placement circuit is known from German Published Patent Application (OS) No. 31 38 247 for detecting a synchronizing signals in PCM data which are reproduced from a magnetic tape, especially in the case of audio PCM data. In this known recording and reproduction device the analog signal is converted into a digital signal by means of pulse code modulation and then recorded on a magnetic tape in a frame similar to the format for recording television signals. In reproduction the digital signal is converted back into an analog video signal. In this case the PCM data stream is subdivided into data blocks, each of which contains a horizontal synchronizing signal as the synchronizing signal. A number of data blocks, which number remains constant is contained within one vertical synchronizing period. In reproduction the block data are separated from the synchronizing signals by use of a gate or a correlation circuit for decoding the PCM coded information. In this system, however, if a signal dropout results from a defect in the magnetic tape or from the presence of dust or from an error in timing control, the equidistant sequence of synchronizing signals can be disturbed.

The known synchronizing signal detection and placement circuit has a first gate circuit with a period approximating the period of the horizontal synchronizing signal and a short correlation time for improvement of the noise margin. In the case of a failure to detect the synchronizing signal the correlation time is extended for greater assurance of detection of the next synchronizing signal. At the same time a substitute synchronizing signal is produced by a pulse generating circuit.

SUMMARY OF THE INVENTION

Briefly, in a first step or operation the equidistant occurrence of synchronizing words is checked within the duration of a watch period following the appearance of the last correct synchronizing word, then in a second operation, if a synchronizing signal appears out of equidistant position or if there is a dropout of mutilation of the expected synchronizing word within a watch period, a signal is generated like one corresponding to detection of a synchronizing word that has correctly appeared and the data following this signal for a period are marked. In a third step or operation, two periods after the last correctly appearing synchronizing word a further coincidence check takes place. If that check has a positive result, the marking of the previously marked data is removed and the data are regularly processed further.

The method of the invention has the advantage that the expense and complication for switching over and changing the correlation time periods is avoided. There is a further advantage that the generator for producing the substitution synchronizing signal can be dispensed with.

From an apparatus standpoint, there is provided a first counter for checking equidistant appearance within a counting period from the appearance of a synchronizing word in the data stream, and a second counter for checking the appearance of a signal dependent upon the appearance of a synchronizing word within two counting periods. There is also an evaluation circuit for recognizing as error-free the data marked as erroneous by a negative result of coincidence checking by the first counter, when in the next counting period there is a positive result of a coincidence check by the second counter.

BRIEF DESCRIPTION OF THE DRAWING

The invention is further described by way of illustrative example by means of the annexed drawing, the single figure of which is a circuit block diagram of apparatus for performing the method of the invention.

DESCRIPTION OF THE ILLUSTRATIVE EMBODIMENT

In a reproduction of data, for example data coded by the NRZ code, there can always remain some errors in spite of none being detected by an error recognition circuit located upstream in the data flow direction. Such errors can lead to disturbance or loss of synchronization, among other things. It is for such cases that the circuit shown in the drawing is provided for recognition and, if necessary, substitution of synchronizing words in the data stream.

It is to be assumed that a magnetic tape recording and reproducing device with two magnetic heads mounted on a head wheel diametrically opposite each other is provided, having an arrangement for the tape to make a loop of somewhat more than 180° in the usual way, so that all the time at least one magnetic head is located in contact with the magnetic tape. Of course, any other configuration of head wheel and magnetic tape which is suitable for processing an uninterrupted data stream would also be assumed for the purpsoe of the understanding of the illustrated circuit.

According to the number of magnetic heads on the head wheel, the circuit illustrated in the drawing has two reproduction channels of which just one is completely illustrated. For the reproduction channel A, the circuit has an input 11 followed by a sampling frequency pulse generator 12, at the output of which the data and the processed sampling frequency pulses (hereinafter referred to as clock pulses) are supplied to separate lines of a serial to parallel converter for transmission to a synchronization word detector 13. An 8-bit shift register is usable for the synchronization word detector 13. Such a shift register is available under the designation F 100 141 manufactured by Fairchild. The data proceed in 8-bit parallel form on 8 parallel data lines 14 leading from the output of the serial to parallel converter and synchronizing word detector 13 over to the playback storage unit 15 that serves for intermediate and line storage. At the same time, the clock pulses are supplied over the line 16 from the synchronization output of the serial to parallel converter and synchronizing word detector 13 over to the synchronization input of the playback storage unit 15.

From another output of the serial to parallel converter and synchronizing word detector 13, a pulse is made available which is present whenever a synchronizing word is recognized in the data stream. This pulse is hereinafter referred to as the synchronizing word pulse. This pulse is in each case supplied over the line 17 to the counting input of the counters 18 and 19. The counters 18 and 19 may be four-stage counters/shift registers of type F 100 136 available as manufactured by Fairchild.

The synchronization inputs of the counters 18 and 19 are connected to the synchronization output of the sampling frequency pulse generator 12. The number of synchronization pulses between two synchronizing words, and thereby between two synchronizing word pulses, is always the same in undisturbed playback. In the illustrated case that number is 300. The counter 18 is preset at this value and when it reaches this value it provides a pulse to the comparator 21. The other input of the comparator 21 is supplied with the number of clock pulses between the beginning or end of two successive synchronizing words or between two successive synchronizing word pulses, as a reference value. This reference value is likewise 300 in the illustrated case. The actual value pulse on the output of the counter 18 appears exactly 300 clock pulses after the previous one.

A counter 26 is started with the channel switchover pulse and is reset with the next channel switchover pulse, which switches the data of the second playback channel. In the meanwhile, the counter 26 generates a window for the coincidence pulses from the output of the AND-gate 22 which thereby proceed to the playback storage unit 15.

The regular sequence of synchronizing words can be spoiled as the result of dropout errors in playback from incomplete tape to head contact, or by defective locations in the tape, or as the result of timing errors which put the sampling pulse generator 12 out of step, or even from individual bit errors in data processing. The counting out or counting down of clock pulses between two synchronizing words then results in no coincidence between reference and actual values and thereby preliminarily indicates data loss. For avoiding the disadvantages that might result from a false indication the supplementary synchronizing word evaluation and synchronizing word substitution are provided in accordance with the invention.

For that purpose, an OR-circuit 23 in parallel with the AND-gate 22. This OR-circuit is supplied with the pulses from the output of the comparator 21 and with synchronizing word pulses over the line 17 from the serial to parallel converter and synchronizing word detector 13. If as the result of time shifts pulses do not arrive exactly at the same time, the AND-gate 22 does not conduct or does not conduct long enough, and the not quite exactly timed or shaped pulse provided at the output of the OR-gate 23 is supplied as a substitute for indicating the beginning of a synchronizing word and is supplied to the playback storage unit 15. In parallel thereto, an evaluation logic circuit 27 evaluates the usability of all synchronizing pulses which do not relate back to unconditional coincidence.

A synchronizing word can be so displaced by dropout errors or bit errors that it fails to be recognized as such by the synchronization detector 13. In order that the data may be evaluated in spite of that and not lost, a substitution circuit with an additional counter 19 is provided in parallel to the counter 18. The counter 19, however, counts twice the number of clock pulses, i.e. it is reset only by every other synchronizing word pulse from the synchronization word detector 13. The reference value supplied to the comparator 24 is accordingly twice the reference value of clock pulses between successive synchronizing words, in the present case 600 for comparison of the count results. In the case of coincidence, the comparator 24 provides a pulse to a second AND-gate 25 which is supplied by its second input to the synchronizing word pulses provided on the line 17. In the case of simultaneous presence of a pulse from the caparator 24 and a synchronizing word pulse from the output of the synchronizing word detector 13, the AND-gate 25 conducts and applies an output to an additional output of the evaluation logic circuit 27. The latter circuit utilizes this pulse as a third possibility for receiving a synchronizing word when the first two possibilities lead to no useful result.

The evaluation circuit 27 marks all data words coming after a missing or time shifted synchronizing word pulse as erroneous and identifies them for correction or error concealment in other circuits not shown. In the usual case, the data are initially processed normally when the first synchronizing pulse drops out and the substitution of the synchronizing word corresponding to the count result of the counter 21 is checked by the counter 24. If coincidence is found, the substitution was therefore justified, but if there is no coincidence, the data words following the substitution are accordingly evaluated, and then further processed, as erroneous.

Although the invention has been described with reference to a particular illustrated example, it will be recognized that modifications and variations are possible within the inventive concept.

I claim:

1. Method of detecting synchronization words in a PCM serial data stream having a sampling frequency and checking the timing of said words for marking, as erroneous, a block of data following a missed or mutilated synchronization word, comprising:

checking, by reference to sampling frequency counting, the equidistance of successive synchronization words, and providing a check signal for each correctly timed synchronization word;

in the event recognition of an expected synchronization word is missed in the said checking, then providing a provisional check signal and marking following data signals as dubious;

following every said check signal, checking the timing of the afternext synchronization word to produce a verifying signal in the case of correct timing;

in the event a said verifying signal follows a said provisional check signal by one synchronization word equidistance period, removing said marking of data signals as dubious, and in the event no said verifying signal follows a said provisional check signal by one synchronization word equidistance period, identifying said dubious-marked data signals as erroneous, for further processing.

2. Method as defined in claim 1, wherein a said provisional check signal is provided only if, at the time recognition of an expected synchronization word is missed, a signal appears which has a predetermined degree of mutilated resemblance to a synchronization word.

3. Apparatus for detecting and checking the timing of synchronization words in a PCM serial data stream having a sampling frequency and thereby evaluating validity of PCM serial data interposed between synchronization words, comprising:

a first counter for counting out at a sampling frequency the normal period between synchronization words and for providing a first timing signal after the lapse of one said normal period after the appearance of each said synchronization word and means for producing a check signal in response to coincidence of a said first timing signal and the appearance of the next synchronization word, and for producing a provisional check signal in the absence of a said coincidence, a second counter for counting out, at said sampling frequency, twice said normal period between synchronization words, for providing a second timing signal after the lapse of two said normal periods after the appearance of a said synchronization word, and means for providing a verification signal in response to the coincidence of a said second timing signal and the appearance of a synchronization word;

means for marking data following the occurrence of said provisional check signal as dubious, and means for removing a marking of data signals as dubious in the event a said verification signal follows a said provisional check signal by a said normal period and for substituting a marking of data signals as erroneous for a previous marking of data signals as dubious in the event no said verification signal follows a said provisional check signal by a said normal period.

4. Apparatus as defined in claim 3, wherein said means for producing check signals and provisional check signals produces a said provisional check signal only if coincidently with said timing signal there appears a signal having a predetermined degree of mutilated resemblance to a synchronization word.

* * * * *